US008132216B1

(12) United States Patent
Tatem

(10) Patent No.: US 8,132,216 B1
(45) Date of Patent: Mar. 6, 2012

(54) METHOD AND SYSTEM FOR CONTROLLING A MULTI-TERMINAL SYSTEM

(75) Inventor: Richard B. Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 626 days.

(21) Appl. No.: 12/266,829

(22) Filed: Nov. 7, 2008

(51) Int. Cl.
H04N 7/18 (2006.01)

(52) U.S. Cl. .......... 725/78; 725/801; 725/133; 725/141; 725/151

(58) Field of Classification Search .............. 725/75–80, 725/133, 141, 151
See application file for complete search history.

(56) References Cited

U.S. PATENT DOCUMENTS

| | | | |
|---|---|---|---|
| 5,058,138 A | 10/1991 | Figura et al. | |
| 5,742,680 A | 4/1998 | Wilson | |
| 5,970,386 A | 10/1999 | Williams | |
| 6,112,232 A * | 8/2000 | Shahar et al. | 709/217 |
| 6,622,307 B1 | 9/2003 | Ho | |
| 6,868,255 B1 | 3/2005 | Chanteau et al. | |
| 7,890,552 B2 | 2/2011 | Reichman | |
| 2002/0026645 A1 | 2/2002 | Son et al. | |
| 2002/0046406 A1 | 4/2002 | Chelehmal et al. | |
| 2002/0116707 A1 | 8/2002 | Morris et al. | |
| 2003/0053562 A1 | 3/2003 | Busson et al. | |
| 2004/0006772 A1 | 1/2004 | Ansari et al. | |
| 2004/0163125 A1 | 8/2004 | Phillips et al. | |
| 2004/0172658 A1 | 9/2004 | Rakib et al. | |
| 2004/0250273 A1 | 12/2004 | Swix et al. | |
| 2004/0252243 A1 * | 12/2004 | Stewart | 348/725 |
| 2005/0216937 A1 * | 9/2005 | Shintani et al. | 725/72 |
| 2006/0041925 A1 | 2/2006 | Suh | |
| 2006/0126551 A1 | 6/2006 | Delaunay et al. | |
| 2006/0271954 A1 | 11/2006 | Lankford et al. | |
| 2007/0033621 A1 | 2/2007 | Roeck | |
| 2007/0101398 A1 | 5/2007 | Islam | |
| 2007/0107019 A1 | 5/2007 | Romano et al. | |
| 2007/0115933 A1 | 5/2007 | Muhamed et al. | |
| 2007/0164609 A1 | 7/2007 | Shalam et al. | |
| 2007/0266414 A1 | 11/2007 | Kahn et al. | |
| 2008/0022322 A1 | 1/2008 | Grannan et al. | |
| 2008/0066095 A1 | 3/2008 | Reinoso | |
| 2008/0109854 A1 | 5/2008 | Casavant et al. | |
| 2008/0127277 A1 | 5/2008 | Kuschak | |

(Continued)

FOREIGN PATENT DOCUMENTS

WO 2004054157 A2 6/2004

(Continued)

OTHER PUBLICATIONS

Anonymous; "ANGA Sees European Launch of RGB Networks USM—The Cable Industry's Highest Density QAM Modulator"; IPTV Industry; May 22, 2007; XP002524087; Retrieved from the Internet: URL:http://www.iptv-industry.com/pr/6d.htm; the whole document.

(Continued)

Primary Examiner — Hunter Lonsberry

(57) ABSTRACT

A method and system for controlling a terminal includes a receiving unit in communication with the plurality of terminals receiving a command signal and converting the command signal to a serial port control signal. The receiving unit formats the serial port control signal to form a formatted signal. A terminal device receives the formatted signal, recovers the serial port control signal from the formatted signal and controls a terminal device in response to the serial port control signal.

22 Claims, 7 Drawing Sheets

U.S. PATENT DOCUMENTS

| | | |
|---|---|---|
| 2008/0301748 A1 | 12/2008 | Lida et al. |
| 2009/0141735 A1 | 6/2009 | Kolhi |
| 2009/0278992 A1 | 11/2009 | Gutknecht et al. |
| 2009/0320055 A1 | 12/2009 | Langille et al. |
| 2009/0320058 A1 | 12/2009 | Wehmeyer et al. |

FOREIGN PATENT DOCUMENTS

| | | |
|---|---|---|
| WO | 2007050081 | 5/2007 |

OTHER PUBLICATIONS

Anonymous; "Continuum DVP Dense QAM Array for Video-on-Demand Delivery"; Scientific Atlanta; Jun. 30, 2002; XP002524543; Retrieved from the Internet: URL:http://www.scientificatlanta.com/customers/source/7000183.pdf; the whole document.

Anonymous; "Motorola SmartStream Encryptor Modulator"; Jul. 1, 2003; XP55008043; retrieved from the Internet: URL:http://broadband.motorola.com/catalog/product_documents/SEM_wp_july03.pdf [retrieved on Sep. 26, 2011].

European Telecommunications Standards Institute (ETSI); "HFC (Cable TV) Access Networks; Part 1: Interworking the PSTN, N-ISDN, Internet and Leased lines Networks [Network aspects]"; ETSI Draft; TD05M; 650 Route Des Lucioles, F-06921 Sophia-Antipolis, France; No. V1.1.1; Oct. 9, 1998; pp. 1-41; XP014057863; [retrieved on Oct. 9, 1998].

* cited by examiner

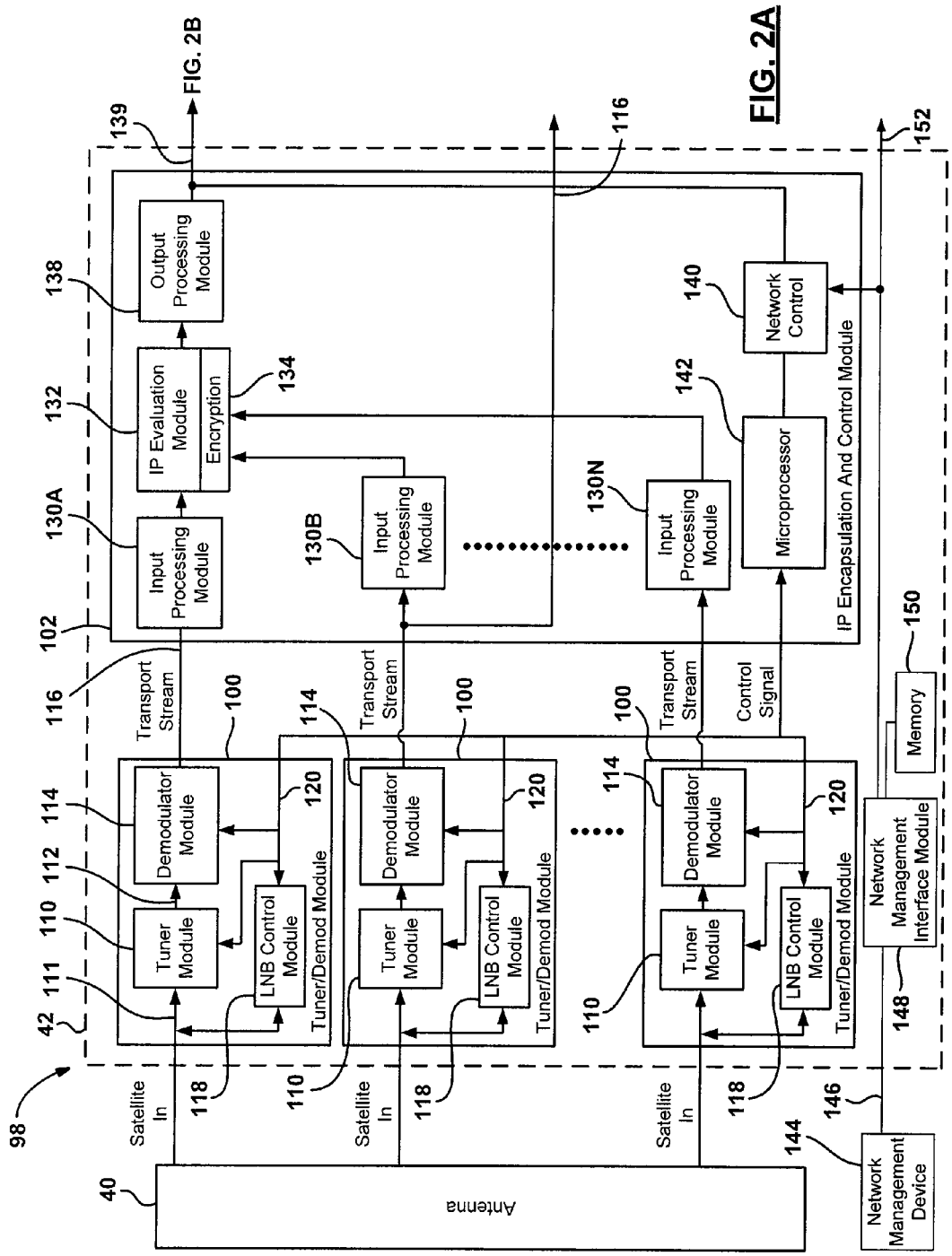

US 8,132,216 B1

METHOD AND SYSTEM FOR CONTROLLING A MULTI-TERMINAL SYSTEM

TECHNICAL FIELD

The present disclosure relates generally to satellite television systems and, more particularly, to a satellite television system acting as a local head end to distribute various channels and a method for controlling the same.

BACKGROUND

Satellite television has become increasingly popular due to its wide variety of programming. Typical satellite receivers are designed as one integrated unit. That is, the various tuning functions, conditional access functions and processing are all performed on the same circuit board.

For certain types of applications, an IP encapsulated bitstream is desirable. The IP bitstream is distributed to various monitors for playback. The IP solutions are typically targeted at large installations to support hundreds of simultaneous users. Such systems are typically not economical for low-end installation requiring only a modest number of receivers. Such applications include low-end commercial applications such as bars, waiting rooms and single-family homes. A set top box capable of converting the IP stream to usable signals is typically used. Providing some basic service to applications such as multiple dwelling units is desirable.

Hotels and other applications may also use a satellite master antenna television (SMATV) system. In particular, hotels and other properties have a need to provide information to customers that are specific to the property. Other types of systems such as vehicle-based systems may include multiple terminals.

Multiple terminal systems typically require each terminal to be controlled individually. In certain systems each terminal is desired to be tuned in a similar manner. The time to perform this tuning may take a significant amount of time in a system having many terminals. Other types of control also require individual terminal action.

SUMMARY OF THE DISCLOSURE

The present disclosure allows controlling one or multiple terminals in a local system. The local system may be within a building, multiple dwelling unit, or multiple terminal system in a vehicle such as in an airplane, ship, train or the like.

In one aspect of the disclosure, a system includes a receiving unit in communication with the plurality of terminals receiving a command signal and converting the command signal to a serial port control signal. The receiving unit formats the serial port control signal to form a formatted signal. A terminal device receives the formatted signal, recovers the serial port control signal from the formatted signal and controls a terminal device in response to the serial port control signal.

In a further aspect of the disclosure, a method includes converting a command signal to a serial port control signal, formatting the serial port control signal to form a formatted signal, communicating the formatted signal to a terminal device, recovering the serial port control signal from the formatted signal and controlling the terminal device in response to the serial port control signal.

In yet another aspect of the disclosure, a method includes generating a command signal for a terminal device having a terminal device identifier, communicating the command signal and the terminal device identifier to receiving unit, converting the command signal to a serial port signal, communicating a packetized signal incorporating the serial port command to a terminal device corresponding to the terminal device identifier, extracting the serial command from the packetized signal and implementing the serial command at the receiving service.

Other features of the present disclosure will become apparent when viewed in light of the detailed description of the preferred embodiment when taken in conjunction with the attached drawings and appended claims.

BRIEF DESCRIPTION OF THE DRAWINGS

FIGS. 2A and 2B are a continued detailed block diagrammatic view of a receiving unit and associated distribution system.

DETAILED DESCRIPTION

Figure 1:
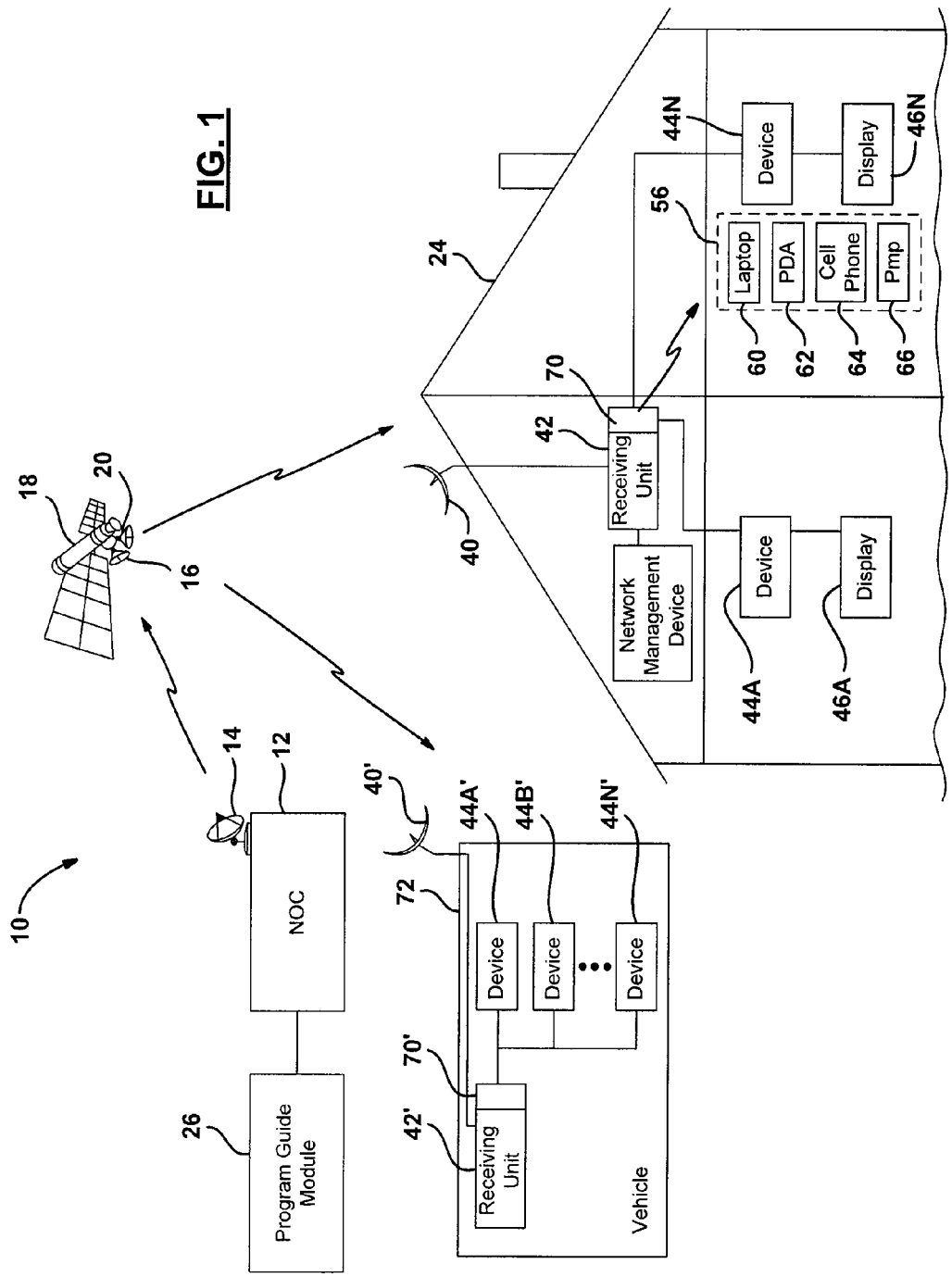
FIG. 1 is a system level view of a satellite broadcasting system according to the present disclosure.

In the following figures the same reference numerals will be used for the same views. The following figures are described with respect to a satellite television system. However, those skilled in the art will recognize that the teachings of the present disclosure may be applied to various types of systems including a cable system.

As used herein, the term module refers to an Application Specific Integrated Circuit (ASIC), an electronic circuit, a processor (shared, dedicated, or group) and memory that executes one or more software or firmware programs, a combinational logic circuit, and/or other suitable components that provide the described functionality. As used herein, the phrase or at least one of A, B, and C should be construed to mean a logical (A or B or C), using a non-exclusive logical OR. It should be understood that steps within a method may be executed in different order without altering the principles of the present disclosure.

Referring now to FIG. 1, a satellite television broadcasting system 10 is illustrated. The satellite television broadcasting system 10 includes a network operations center 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a home 22 as well as multiple dwelling units and commercial buildings 24. The wireless signals may have various types of information associated with them including various channel information such as a channel or program guide, metadata, location information and the like. The wireless signals may also have various video and audio signal information associated therewith. The wireless signals may also include program guide data from a program guide module 27. The program guide module 27 may communicate various objects to the network operation center 12 so that a grid guide may be displayed on a display associated with a receiving device. Various types of data may be communicated about the programming and grid guide including the channel number, a network identifier, program data such as a start and end time of airing, title, numerical identifier, content data such as actors, descriptions, ratings and the like. Grid guide data may include the relative positions of the data, the line structures and the like.

Building 24 includes a receiving antenna 40 that receives the wireless signals from the satellite 18 and processes the signals in a gateway or receiving unit 42. An IP encapsulated bitstream may be generated at the receiving unit 42 to provide signals in a second format. A plurality of devices 44A-44N in communication with the receiving unit 42 receives the IP encapsulated bitstream and controls a display 46A-46N in response to the bitstream. The displays 46A-46N may include either an audio or a video display, or both.

As was mentioned above, the system may also apply to a cable or wired system. In such a case, the antenna 40 would be replaced with a cable connection. The system may also be used in a terrestrial broadcast system. In such a case, the satellite antenna 18 would be replaced by a terrestrial signal receiving antenna.

The present disclosure may also be used for displaying various wireless information on a personal mobile device 56, such as a laptop computer 60, a personal digital assistant 62, a cellular telephone 64 or a portable media device 66. It should be noted that the personal mobile devices 56 may receive wireless signals having various types of information from a router 70 that is in communication with the receiving unit 42. The router 70 may be wireless.

The router 70 may also be a wired router for distributing signals to the plurality of terminal devices 44A-44N. The router 70 may be an independent unit or incorporated into the receiving unit 42. An IP switch or router 70 may also be an optional feature depending on the system. The router, server, receiving unit and the plurality of terminals may form a network. In this example, an IP network is formed.

The local content distribution system or multi-terminal system may also be disposed within a vehicle 72. The system may also include an antenna 40', receiving unit 42' and a plurality of terminals 44A', 44B' . . . 44N'. The vehicle may be different types of vehicles including an airplane, ship, train, bus, van or automobile.

Figure 2B:
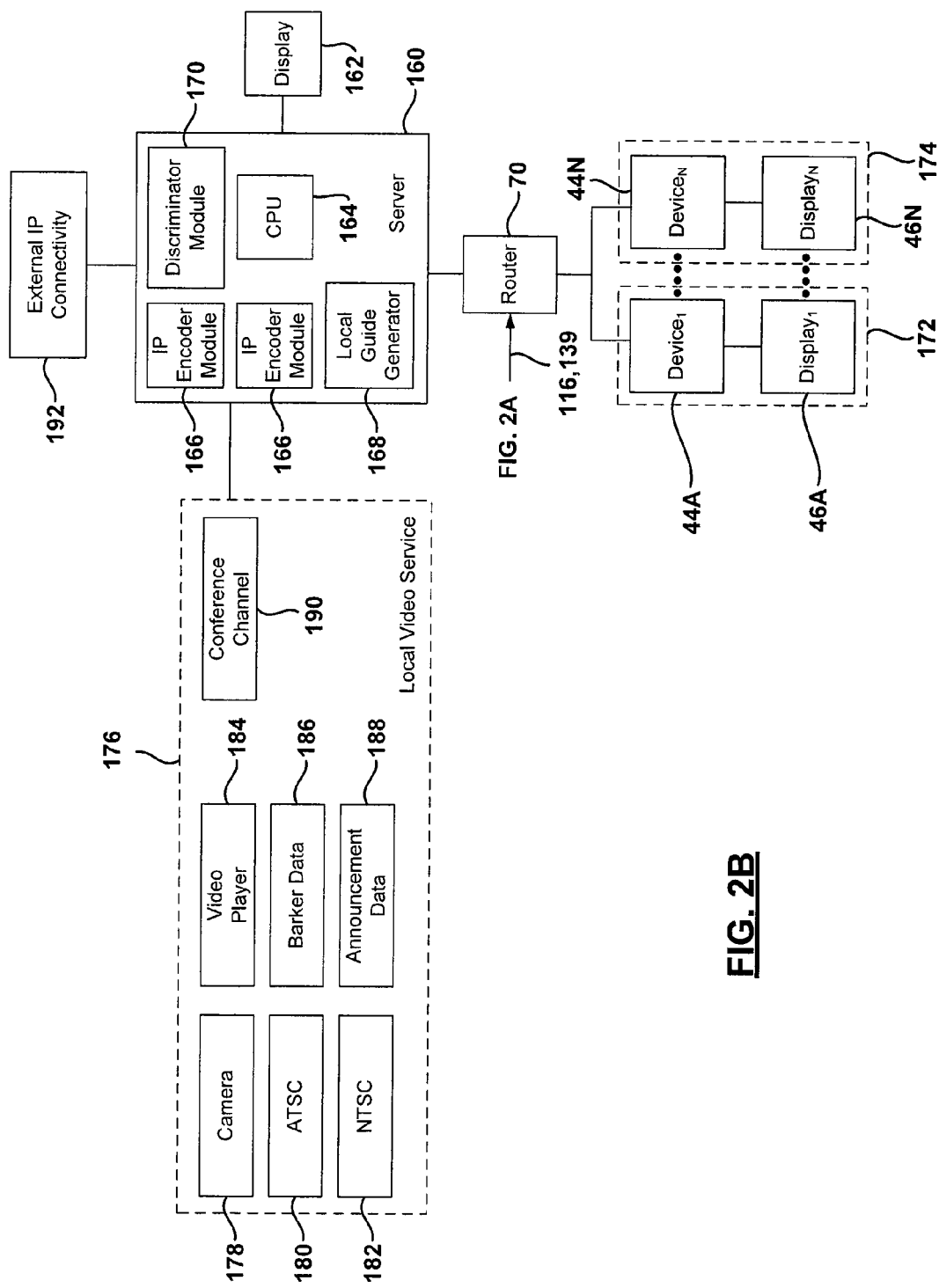

Referring now to FIGS. 2A and 2B, the present disclosure is applicable to a multi-terminal system 98 that includes a number of devices and a number of displays. Such a system may be suitable for multiple dwelling units, commercial buildings such as a bar or stadium, vehicles or large single-family homes. In this example, one or more antennas 40 may be coupled to a plurality of tuner demodulator modules 100 within the receiving unit 42. Antenna 40 may be various types of antennas. The antenna 40 may be a single antenna used for satellite television reception, or a number of antennas. The antenna 40 may also be an electronic or moving antenna. An electronic antenna or moving antenna may be particularly useful in a vehicle.

The receiving unit 42 of the system 98 is illustrated in further detail. The receiving unit 42 may be formed to be modular. The receiving unit 42 may include a plurality of tuner demodulator modules 100 formed on a first circuit board and an IP encapsulation and control module 102 formed on a second circuit board. The modules within the receiving unit may be arranged physically in any number of ways. The circuit boards may contain the components of their respective module. The circuit boards may be spaced apart and a connector, bus or communication link may be used to interconnect the two modules.

The tuner demodulator module 100 includes a tuner 110 that receives the signal or the satellite signal 111 for the selected channel and generates a tuner signal 112. The tuner signal 112 is provided to a demodulator module 114 that demodulates the tuner signal 112 to form a demodulated signal or transport stream 116.

A low noise block (LNB) control module 118 is in communication with the tuner module 110 and the demodulator module 114. The LNB control module 118 may control the tuner and demodulator functions according to received control signals 120. For example, the LNB control module 118 may switch the LNB contained in the antenna 40 to receive the proper signals requested by the IP encapsulation and control module 102. Further, guide data or conditional access data and other information may be requested from the IP encapsulation and control module and provided for in the low noise block control module 118. The LNB control module 118 may be used for powering the outdoor unit (the antenna 26) and selecting the particular orbital location if needed.

Each IP encapsulation and control module 102 includes a plurality of input processing modules collectively referred to with reference numeral 130. Each tuner demodulator module 100 may include a respective input processing module 130A through 130N. The input processing module 130 may act as a buffer for buffering the transport stream signal 116. The input processing module 130 also acts as a filter passing only those packets needed by downstream devices 30 or 44 and discarding the packets that are not needed by downstream devices.

An IP encapsulation module 132 receives the transport stream and repackages it using an internet protocol (IP) to form an IP encapsulated signal 136. A single IP encapsulation module or multiple IP encapsulation modules 132 may be provided. Additional network control messages may also be inserted by the IP encapsulation module 132. The IP encapsulation module 132 may provide various information in the form of a packet header. The packet header may include information such as the destination IP address, the source IP address, the type of protocol, various flags, check sums, metadata such as channel information, ratings, and the like. The destination address may be one address or group of addresses. Various types of transport packets may be formed depending on the desired characteristics of the system. TCP, UDP, DCCP, SCTP and the like may be used. An encryption module 134 may encrypt the encapsulated signal 136.

The IP encapsulated signal 136 is communicated on output processing module 138. The encryption module 134 is an optional module that may be separate from the IP encapsulation module 132 or included therein. The output processing module 138 may also act as a buffer for buffering output to the device 44A-44N. The output of 138 is IP stream 139.

A network control module 140 is used to monitor the IP network and accept commands from downstream equipment requesting channel changes, guide data, conditional access data and the like. The network control module 140 manages the aspects of the IP data sent to and from the system into the IP network. The network control module 140 may also generate control commands or communicate control commands.

A microprocessor 142 is in communication with the input processing module 130, the IP encapsulation module 132, the output processing module 138, and the network control module 140. The microprocessor 142 also generates control signals to the LNB control module 118 of the tuner demodulator module 100. The microprocessor 142 may also be in direct communication with the tuner module 110 and the demodulator module 114. The control protocol may include I$^2$C industry standard or various other types of industry standards or custom standards suitable for this application.

The transport streams may correspond to one or more particular channel. The number of tuner demodulator modules 100 depends upon various system parameters. For example, if each terminal device 44A-44N may be tuned to a different channel, then a separate tuner demodulator module 100' may be provided for each respective terminal device 44 up to and including the total number of unique transponders (satellite system) or RF frequencies (cable, terrestrial) used by the system. If less than each of the devices may be used at any one particular time, the number of tuner demodulator modules 100 may be accordingly reduced. Likewise, in a sports bar setting, only a few different channels may be required. Therefore, a small number of tuner demodulator modules 100 may be provided.

One advantage to the system set forth in FIGS. 2A and 2B is that identical tuner demodulator modules 100 may be provided. These modules may, thus, be mass produced and because of the economies of scale, the cost is reduced. Also, standard configurations of the IP encapsulation and control module 102 may also be formed. The example shown in FIG. 2 includes one set of circuitry used to drive one terminal device 44. Of course, multiple devices using the same channel may be operated using the IP encapsulation and control module 102. The IP encapsulation and control module 102 illustrated in FIG. 2 may be mass produced in standardized format. Each of the variances may be mass produced and, thus, the overall cost of the system is reduced, decreasing the number of customer configurations. The circuitry of the IP encapsulation and control module 102 is essentially repeated with additional input processing buffers 130A through 130N.

A network management device 144 is in communication with the receiving unit 42. The network management device 144 may be a computer or other type of controller that is in communication with the receiving unit 42 through a network 146. The network 146 may be a computer network such as the interne and may be wired or wireless. As will be described below, the network management device 144 may include a screen display interface through a web page or the like. The network management device 144 communicates command signals to a network management interface module 148 through the network 146. The commands may correspond to serial port commands. They may be formatted in many ways including a simple network management protocol (SNMP). The network management interface module 148 may be a standalone module within the receiving unit 142. The network management interface module 148 may also be included in the IP encapsulation and control module 102. A memory 150 may also be associated with the network management interface module 148. The memory 150 may include data corresponding to hexadecimal strings for commanding the terminals 44. The network management interface module 148 may convert the commands received from the network management device 144 to serial port control signals 152 using the data within the memory 150. The output of the network interface module 148 may be a formatted signal for communicating with the terminals 44. The serial port control signal may be communicated through the network control 140 through the IP stream 139. One example of a suitable format is to communicate the serial control signal by way of a piggyback real-time transfer protocol (RTP) control packet to the terminal.

The network management device 144, in addition to a command, may also provide a terminal identifier for controlling a specific device or terminal. The network management 144 may be used to control one terminal, a group of terminals, or all terminals within the device system. The terminal identifier may also form part of the serial port control signal generated by the network management interface module 148 and communicated to the terminals 44. Details of the method for communicating between the network management interface module 148 and the terminals 44 will be described further in FIG. 5. The router 70 may receive and distribute the IP stream and the serial port control signals 152. The router 70 may route the signals 139, 152 to the terminals 44. The routing may be performed in response to a terminal identifier in the signal.

As is shown in FIG. 2B, the router 70 of FIG. 1 is included in the system. The router 70 may be a hard-wired router or a wireless router. The wireless router forms a wireless local area network (WLAN). The wireless local area network may be coupled to various devices including the wireless devices 56 represented by reference numbers 60-66 in FIG. 1.

The router 70 may receive and distribute the IP stream and the serial port control signals 152. The router 70 may route the signals 139, 152 to the terminals 44. The routing may be performed in response to a terminal identifier in the signal.

The transport stream 116 from the tuner demodulator module 100 may also be provided to the router 70. This may be passed through the IP encapsulation and control module or provided directly from the tuner demodulator module 100.

The router 70 may also be in communication with a local server 160. The local server 160 may be a server having a display 162 associated therewith. The local server 160 may serve many purposes, including processing various data in a CPU 164, encoding through encoder modules 166 local video sources as will be described below. The server may also include a local guide generator 168 used to insert local channels within the program guide as will be further described below. A discriminator module 170 may also be included within the server 160. The discriminator module 170 may be used to provide capability to discriminate receiving sources of various content. For example, a first group 172 of devices may be established for receiving information whereas a second group 174 of terminal devices 44 may be provided to not receive information. Examples of uses of the discriminator module 170 may be for hotels to provide conference materials to various conference attendees, while preventing others not attending the conference from receiving the content. Services such as services provided to a concierge floor or an executive suite may be different than those offered to general guests.

The encoder module 166 may use various types of encoder modules that include MPEG2 encoders, MPEG4 encoders, AVI or H.264 type encoders. The encoders are in communication with a local video source 176. The local video source 176 may include one source or multiple sources. One example of a local video source 176 is a camera 178. The camera 178 may be directed to various places such as a front door security camera, a fitness center camera or a camera at a particular event. The local video source may also include an ATSC video source 180 or an NTSC source 182. These sources may be received over the air and provide local information throughout the communication system. The ATSC video source and NTSC source may generate signals on-site. A video player 184 may also act as a local video source 176. The video player 184 may be a digital video player, a digital video recorder, a tape player, or the like. An example of a suitable use for a video player 184 would be to provide a hotel guest with local attraction highlights.

The local video source 186 may also include barker data 186. Barker channels may be established for providing information regarding special events or the like in a bulletin board-type format. The barker channel may have various screen shots with or without audio to provide the devices within the distribution system with various information. For example, conference times, local menus or various other types of announcements may be provided within the barker data.

Announcement data 188 may also be separately provided within the local video source 176. The local video source announcement data 188 may provide various types of announcements throughout the system. These may include emergency alerts or the like.

A conference channel 190 may also be separately provided within the local video source 176. The conference channel 190 may include a channel dedicated to various conference attendees.

Although the local video source 176 is illustrated as a separate device, the various functionality may also be incorporated into the server 160. Because the server 160 may also act as a computer, announcement data and other types of data may be controlled and inserted to form various screens. A graphical user interface or the like may be provided to allow the operator of the server to easily insert information to be provided on various channels for guests or residents.

The server 160 may also be used to retrieve information with external IP connectivity 192. By providing IP connectivity, the Internet may be accessed by the server 160. The Internet may also be used to provide control of the server 160 from a remote location. Monitoring of the server 160 may also be provided from a remote location. As mentioned above, the server 160 may be used to create various numbers of channels that are located at various locations within a program guide. The discriminating module 170 is used to provide targeted information in a system as well. For example, one particular terminal device 44 of the plurality of devices or terminals may be targeted for a particular message such as "Rent is Due" or an emergency announcement. By allowing one device to receive the information and excluding others from receiving the information, such a targeted message may be provided. The targeted message may be provided based upon a MAC address or a receiver identifier.

Figure 3:
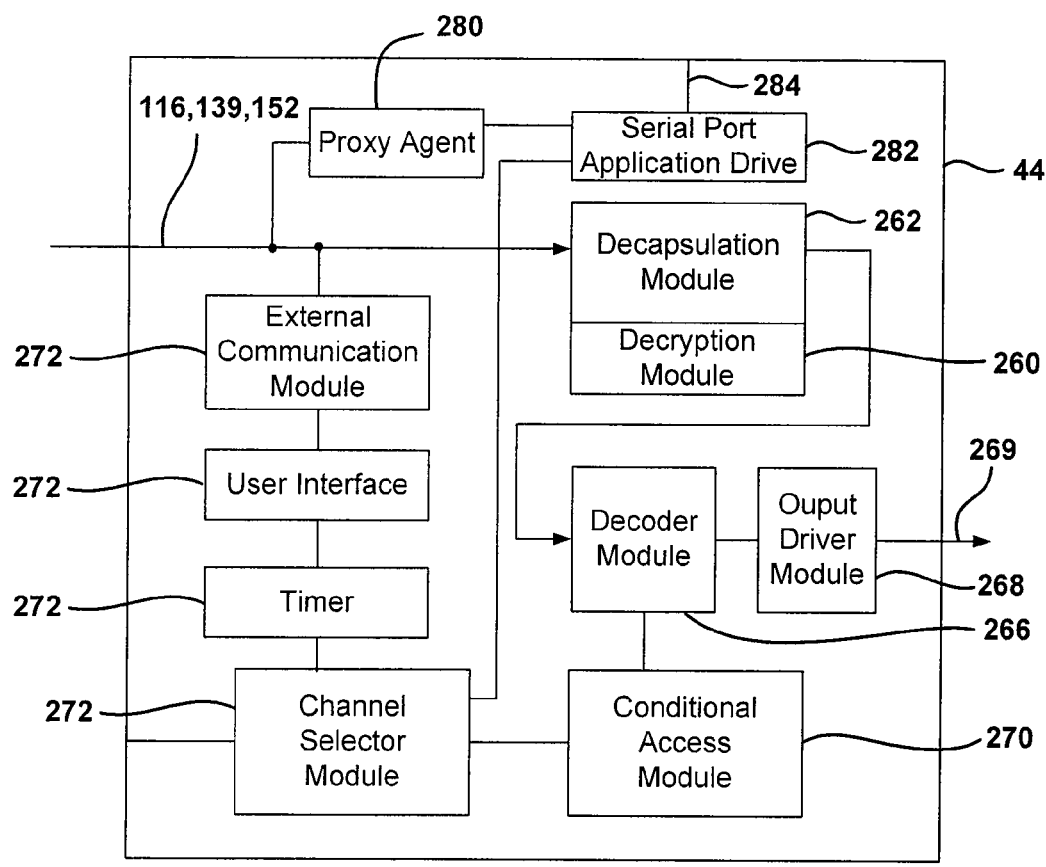
FIG. 3 is a block diagrammatic view of a terminal device.

Referring now to FIG. 3, a local terminal device 44 is illustrated in further detail. Terminal device 44 may include a decryption module 260 if encryption is performed in the receiving unit 42. Decryption module 260 may not be included in a terminal device 44 should the receiving device not include encryption. Each terminal device 44 may have an address such as a MAC address for receiving addressed packets.

A decapsulation module 262 may be used to decapsulate the various IP packets in the IP encapsulated signal 139 from the receiving unit. The output of decapsulation module 262 is a transport stream containing audio/video data, guide information, conditional access information, etc. A decoder module 266, such as an MPEG decoder, receives the transport signal from the decapsulation module 262 and decodes the signal. The decoded signal is provided to an output driver module 268. The output driver module 268 generates various audio and video signals 269 for the display 32 illustrated in FIGS. 1 and 2. A conditional access module 270 may be included in the terminal device 44. Conditional access module 270 may take the form of a conditional access card or other security device. Without a conditional access module 270, the system may not function. Under certain conditions, the conditional access module 270 may be completely removed from the system or moved to the tuner demodulator module 100 or the IP encapsulation and control module 102.

A channel selector module 272 may also be included within the terminal device 44. The channel selector module 272 may generate a channel control signal to communicate the channel desired at the particular device. The channel control signal may be provided to the receiving unit. More specifically, the channel control signal may be provided to the microprocessor 142 module. The input to the channel selector may come from a remote control or push button.

A proxy agent 280 is used to receive the serial port command signals from the network management interface module 148. The proxy agent 280 interprets the formatted incoming IP serial command and communicates the commands to the serial port application driver 282. The serial port application driver 282 utilizes the serial port commands as if the serial port commands came from a serial port 284 within the terminal 44. The proxy agent 280 may thus remove the formatting used for transmitting the serial port command and provide the serial port command to the serial port application driver 282. Each terminal may include a serial port 284 for receiving various serial port commands from other devices. In the present disclosure, the serial port application driver 282 receives a serial port to implement from the proxy agent 280. The serial port application driver 282 implements the serial port command within the terminal 44. For example, the serial port application driver 282 may communicate a channel selection to a channel selector module 272. By controlling the channel selector module 282, the terminal 44 may be force-tuned to a particular channel. The serial port application driver 282 may also be used for other functions, including reconfiguring a receiver setting such as the conditional access module 270 or other settings, aid in troubleshooting the receiver (for customer service or the like) or various other functions. By providing the capability to receive serial commands through the network, one or more terminals may be simultaneously controlled. One example for a suitable use of the present disclosure is tuning each of the televisions in a stadium to a same channel. This may be an internal or locally provided channel, provided through the server 160, illustrated in FIG. 2B. This may also be an externally received channel from the satellite.

When the proxy agent 280 receives a command with the proper terminal identifier, the proxy agent 280 communicates the serial command to the serial port application driver 282. The proxy agent 280 may also be used to generate an acknowledgement command signal communicated back to the receiving unit through the network. The acknowledgement command may be in RTP format or another format. The acknowledgement command may be generated in response to a proper implementation or execution of the serial port command. The serial port application driver 282 may provide a confirmation signal to the proxy agent 280 once the serial command has been implemented.

Figure 4:
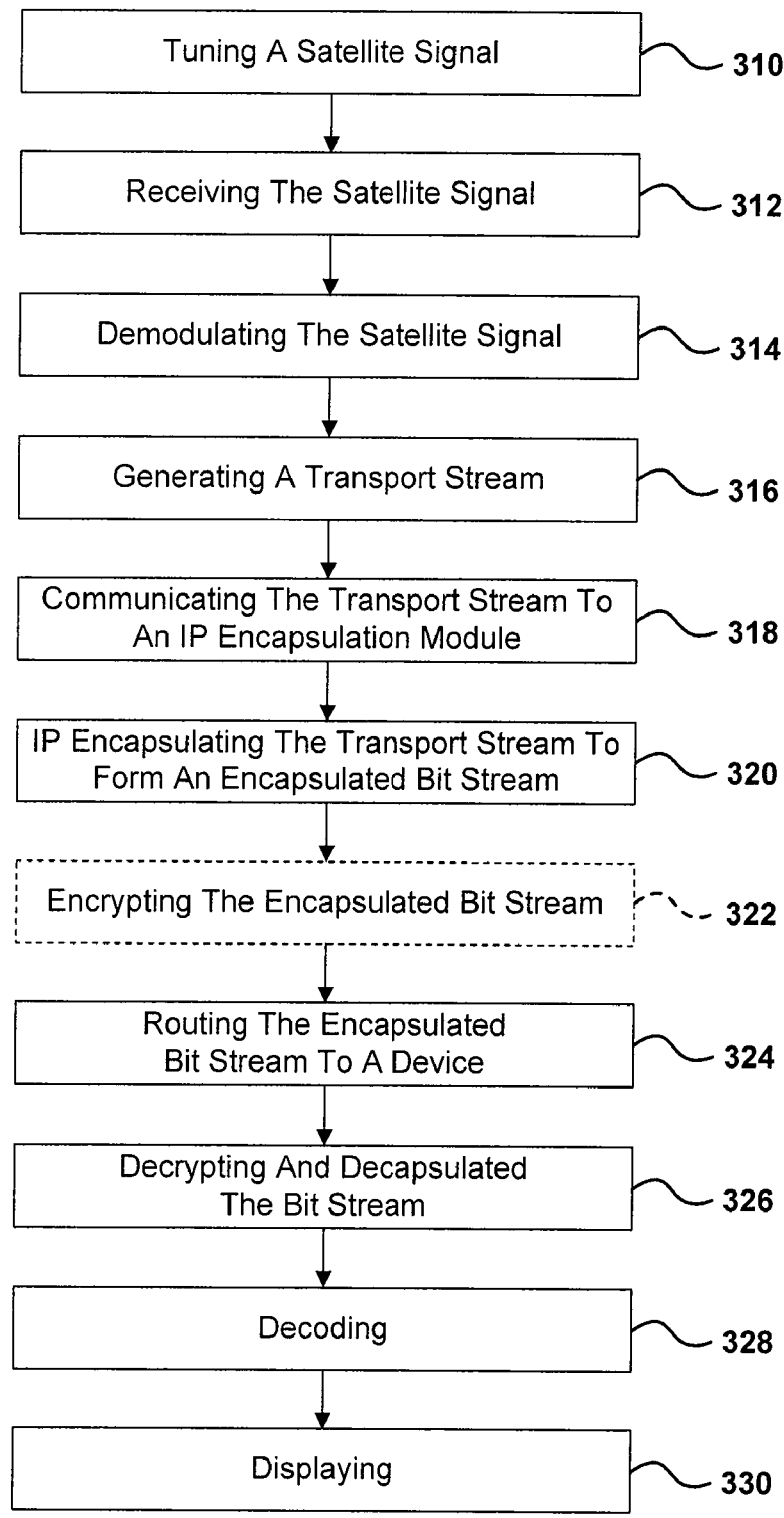
FIG. 4 is a flowchart of a method of receiving a signal according to one aspect of the disclosure.

Referring now to FIG. 4, a satellite signal is tuned in a tuner in step 310. As mentioned above, the signal may be a satellite signal or may also be some other terrestrial signal or cable television signal. In the following example, the satellite signal, rather than a cable or terrestrial signal, will be used. In step 312, the satellite signal is received. In step 314, the satellite signal is demodulated. A transport stream is generated in step 314. In step 318, the transport stream is communicated to the IP encapsulation module 132 of FIGS. 2 and 4. The IP encapsulation module 132 may be separated from the tuner demodulator module 100. In step 320, the transport stream is IP encapsulated to form an encapsulated bitstream.

If encryption is used in the system, step 322 encrypts the encapsulated bitstream. In step 324, the encapsulated bitstream is routed to a device. In step 326, if encrypting is used, the bitstream is decrypted. In step 326, the bitstream is also decapsulized.

In step 328, the bitstream is decoded. In step 330, the signal is displayed. The display may be an audio display or visual display.

It should be noted that some of the modules used in the above, such as the routers, IP encapsulating modules and the like, may also include some IP processing. The present examples provide additional processing to such devices.

Figure 5:
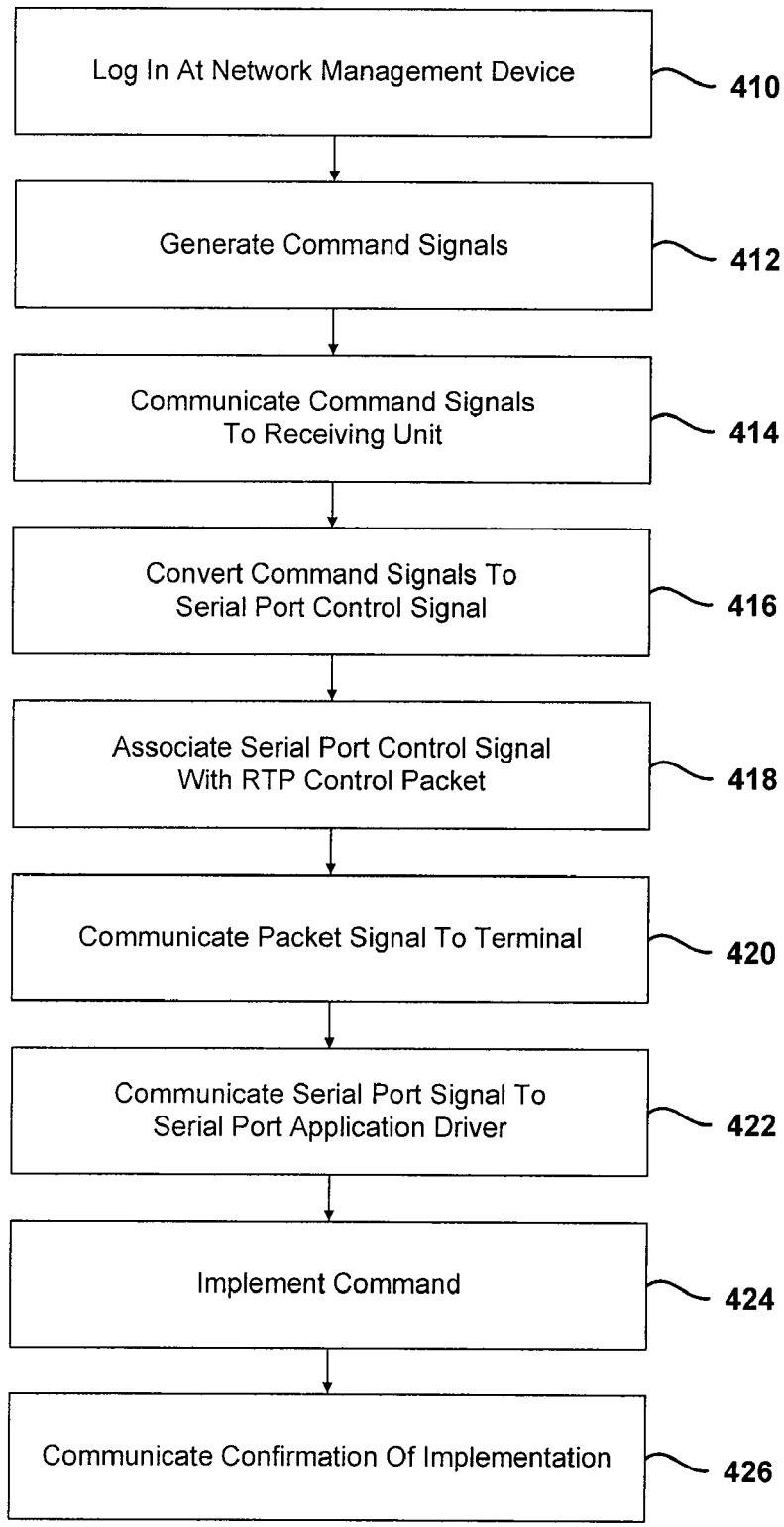
FIG. 5 is a flowchart of a method for controlling a terminal or multiple terminals.

Referring now to FIG. 5, a method for controlling a terminal or a plurality of terminals is set forth. A network management device is used to generate and input command signals. Prior to this, the network management device may be used if a login identifier is provided in step 410. Providing a login identifier will provide secure access to the network management device. This may be an optional step. As mentioned above, the network management device is in communication with a network management interface module. In step 412, the command signals from the network management device are communicated to the network management interface module. The command signals may include a MAC address or terminal identifier, along with a serial command or code that may be converted into a serial command. In step 414, the command signal is communicated to the receiving unit.

In step 416, the command signal is communicated to a serial port control signal within the network management interface module. This may be performed by looking up a proper code corresponding to the command signal in the memory 150. As mentioned above this may be a hexadecimal code recognizable by the terminal as a serial input In step 418, the serial port control signal is formatted for communication to a terminal from the receiving unit. As mentioned above, the serial port control signal may be a piggyback RTP control packet communicated to the terminal. The piggyback signal may be piggybacked onto the signal output signal 139. In step 420, the serial port control signal may be communicated using a formatted packet signal to the terminal. In step 422, the proxy agent illustrated in FIG. 3 may be used to receive the packet signal and extract the serial port control signal therefrom. The serial port signal may be a hexadecimal code or signal provided from the proxy agent to the serial port application driver. In step 422, the serial port control signal extracted through the proxy agent is communicated to the serial port application driver. In step 424, the serial port application driver 282 may communicate the serial port command to a particular module for implementation of the command. In step 424, the command is implemented. Examples of commands include force-tuning the terminal to a particular channel. This may be performed for a predetermined time period or at a specific time, as measured by the timer illustrated in FIG. 3. Other types of commands for configuring the receiver settings or aiding in troubleshooting may also be provided in the serial port control signal.

In step 426, a confirmation of implementation of the command may be provided. This may be an acknowledgment signal in RTP format that is sent from the terminal 44 to the receiving unit 42. The confirmation signal may originate from the serial port application driver that may receive a signal corresponding to the proper implementation of the command. The proxy agent may then send the command to the receiving unit 42.

Figure 6:
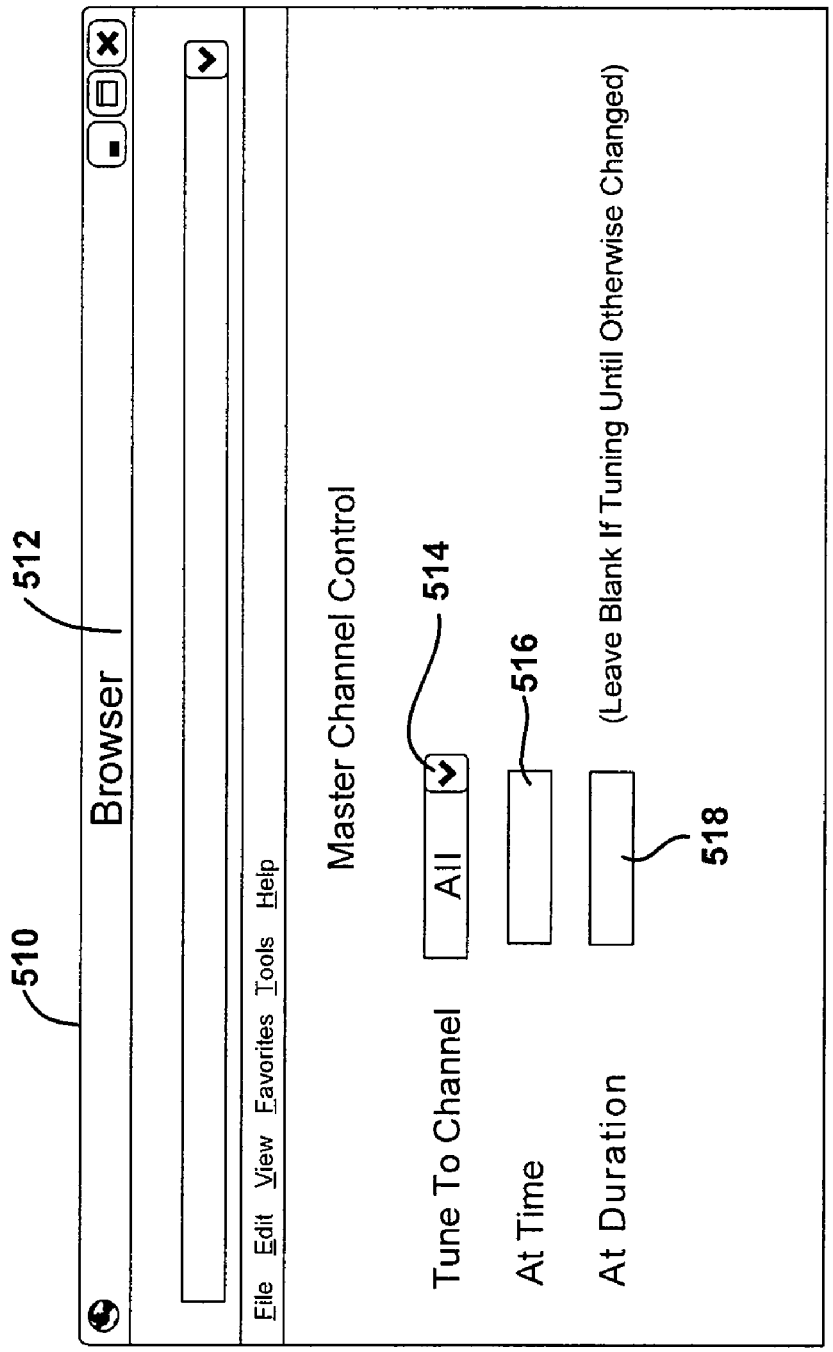
FIG. 6 is a screen display an interface for controlling a terminal or terminals.

Referring now to FIG. 6, a screen display 510 illustrating a browser 512 for interfacing with the network management interface module at the network management device is set forth. A dedicated program or the browser 512 may be provided for interfacing with an operator. The operator may select various parameters or screens to perform the various tasks. For example, in the illustration of FIG. 6, a tuning box 514 may be provided. The tuning box 514 may provide an interface for commanding all of the terminals within a particular network. Likewise, selections may also be made for one or more terminals, but less than all of the terminals. A time box 516 may also be used to provide a time at which the channel may be tuned. A duration box 518 may provide a duration time for the particular program to be tuned. The channel tuning may be performed to override the tuning selection from a remote control or the like for the particular duration in the duration box 518. Thus, only the network management device 144 may be used to change the particular channel. Force-tuning may also take place in the event of an emergency or the like easily through the use of the network management device. Of course, as mentioned above, other types of actions may be performed by the network management device. Once the inputs are provided, a command signal as well as the terminal identifiers are communicated to the network management interface module within the receiving unit as described above.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
   converting a command signal to a serial port control signal;
   formatting the serial port control signal to form a formatted signal;
   communicating the formatted signal to a terminal device;
   recovering the serial port control signal from the formatted signal at the terminal device; and
   controlling the terminal device in response to the serial port control signal.

2. A method as recited in claim 1 wherein prior to converting a command signal to a serial port control signal, receiving a command signal from a network command device.

3. A method as recited in claim 1 wherein converting the command signal comprises converting the command signal to a serial port control signal and a terminal identifier.

4. A method as recited in claim 3 wherein communicating the formatted signal comprises communicating the formatted signal to a receiving device in response to the terminal identifier.

5. A method as recited in claim 1 wherein communicating the formatted signal to terminal device comprises communicating the formatted signal to a plurality of terminal devices.

6. A method as recited in claim 5 wherein controlling a terminal device in response to the serial port control signal comprises controlling a plurality of terminal devices in response to the serial port control signal.

7. A method as recited in claim 6 wherein controlling a plurality of terminal devices in response to the serial port control signal comprises simultaneously tuning the plurality of terminal devices to a predetermined channel.

8. A method as recited in claim 1 wherein controlling a terminal device in response to the serial port control signal comprises tuning a terminal device to a predetermined channel.

9. A method as recited in claim 1 wherein formatting the serial port control signal comprises communicating the formatting the serial port signal into a real time transfer protocol signal.

10. A method as recited in claim 1 further comprising communicating an acknowledgement signal from the terminal to a receiving unit in response to controlling the terminal device in response to the serial port control signal.

11. A method as recited in claim 1 wherein controlling the terminal device comprises controlling the terminal device in a vehicle.

12. A method as recited in claim 1 wherein controlling the terminal device comprises controlling the terminal device in a building.

13. A method of controlling a terminal device comprising:
generating a command signal for the terminal device having a terminal device identifier;
communicating the command signal and the terminal device identifier to a receiving unit;
converting the command signal to a serial port signal;
communicating a packetized signal incorporating the serial port signal to a terminal device corresponding to the terminal device identifier;
extracting the serial port signal from the packetized signal; and
implementing the serial port signal at the receiving unit.

14. A method as recited in claim 13 wherein generating a command signal comprises generating the command signal for a plurality of terminals having a plurality of terminal device identifiers and wherein communicating the packetized signal comprises communicating the packetized signal incorporating the serial port signal to the plurality of terminals corresponding to the plurality of terminal device identifiers.

15. A method as recited in claim 13 further comprising communicating an acknowledgement signal from the terminal to the receiving unit in response to implementing the serial port signal at the receiving service.

16. A system comprising:
a receiving unit receiving a command signal, determining a corresponding serial port signal and formatting the serial port signal to form a formatted signal; and
a terminal device receiving the formatted signal, recovering the serial port signal from the formatted signal and controlling function in response to the serial port signal.

17. A system as recited in claim 16 wherein the terminal device comprises a plurality of terminal devices.

18. A system as recited in claim 17 wherein the plurality of terminals is disposed within a building.

19. A system as recited in claim 17 wherein the plurality of terminals is disposed within a vehicle.

20. A system as recited in claim 17 wherein the plurality of terminals is simultaneously tuned in response to the serial port control signal.

21. A system as recited in claim 16 further comprising a network management device generating the command signal.

22. A system as recited in claim 16 wherein the formatted signal comprises an IP encoded signal.

* * * * *